March 15, 1927.
C. N. SCOTT
1,621,224
HEADLIGHT
Filed June 8, 1925
4 Sheets-Sheet 1
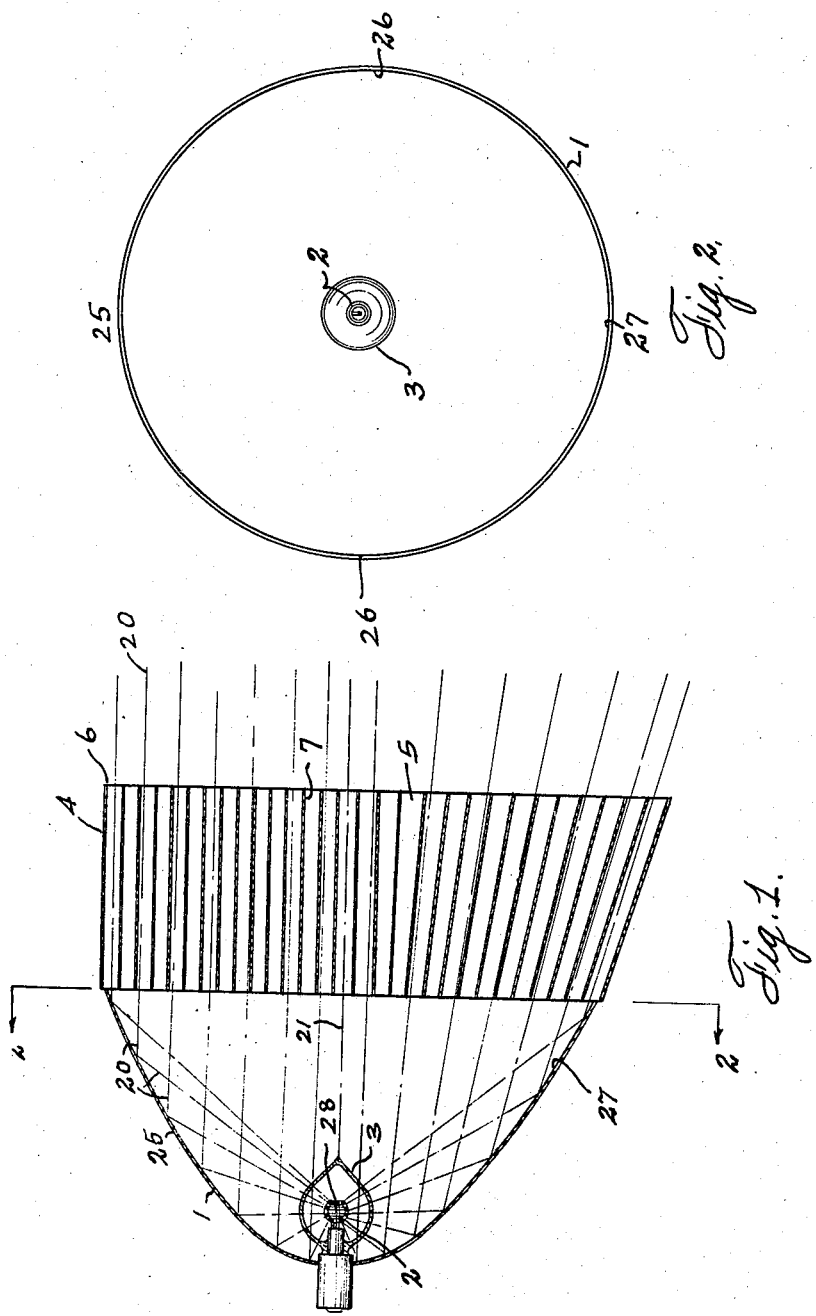
Inventor
Clarence N. Scott
By
Hardway & Cathey
Attorneys March 15, 1927. 1,621,224
C. N. SCOTT
HEADLIGHT
Filed June 8, 1925 4 Sheets-Sheet 2
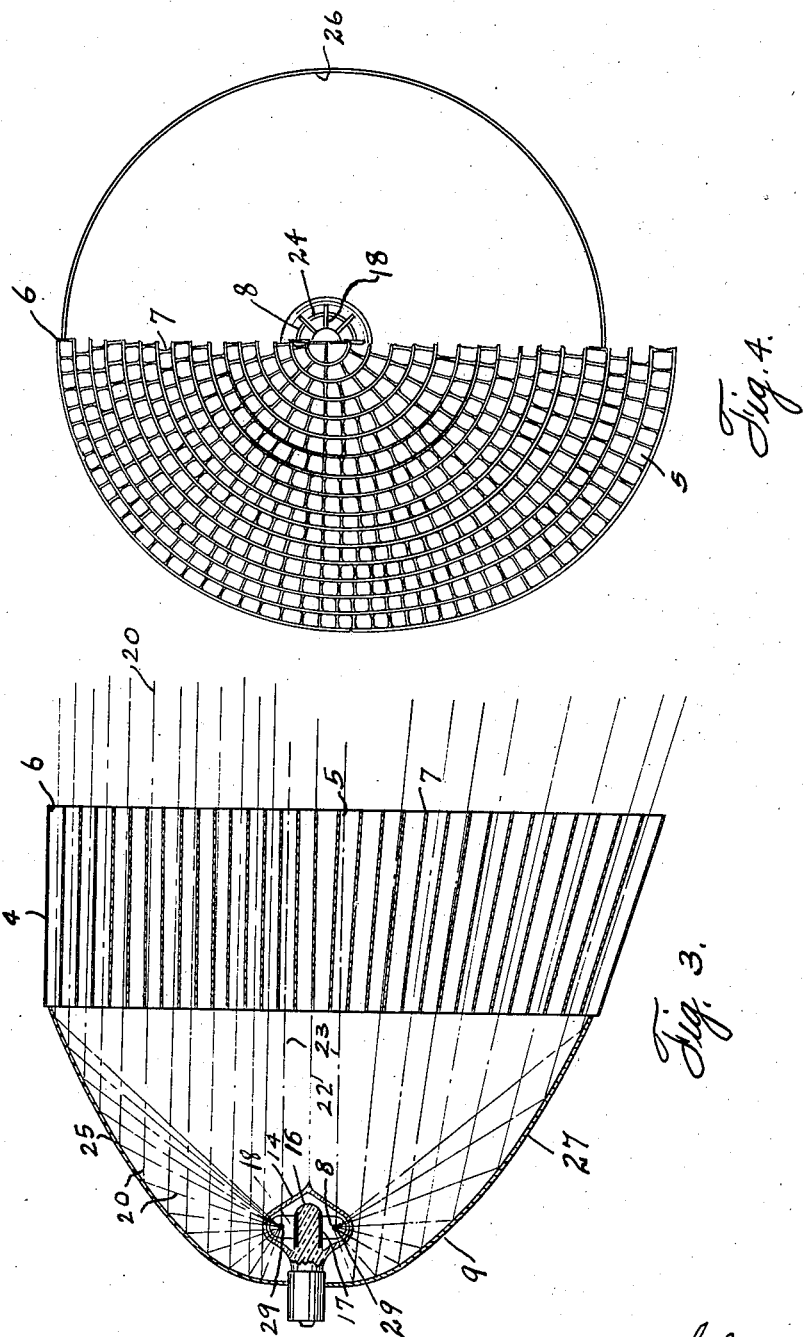
Inventor
Clarence N. Scott
By
Hardway & Cathey
Attorneys March 15, 1927.  1,621,224
C. N. SCOTT
HEADLIGHT
Filed June 8, 1925  4 Sheets-Sheet 3
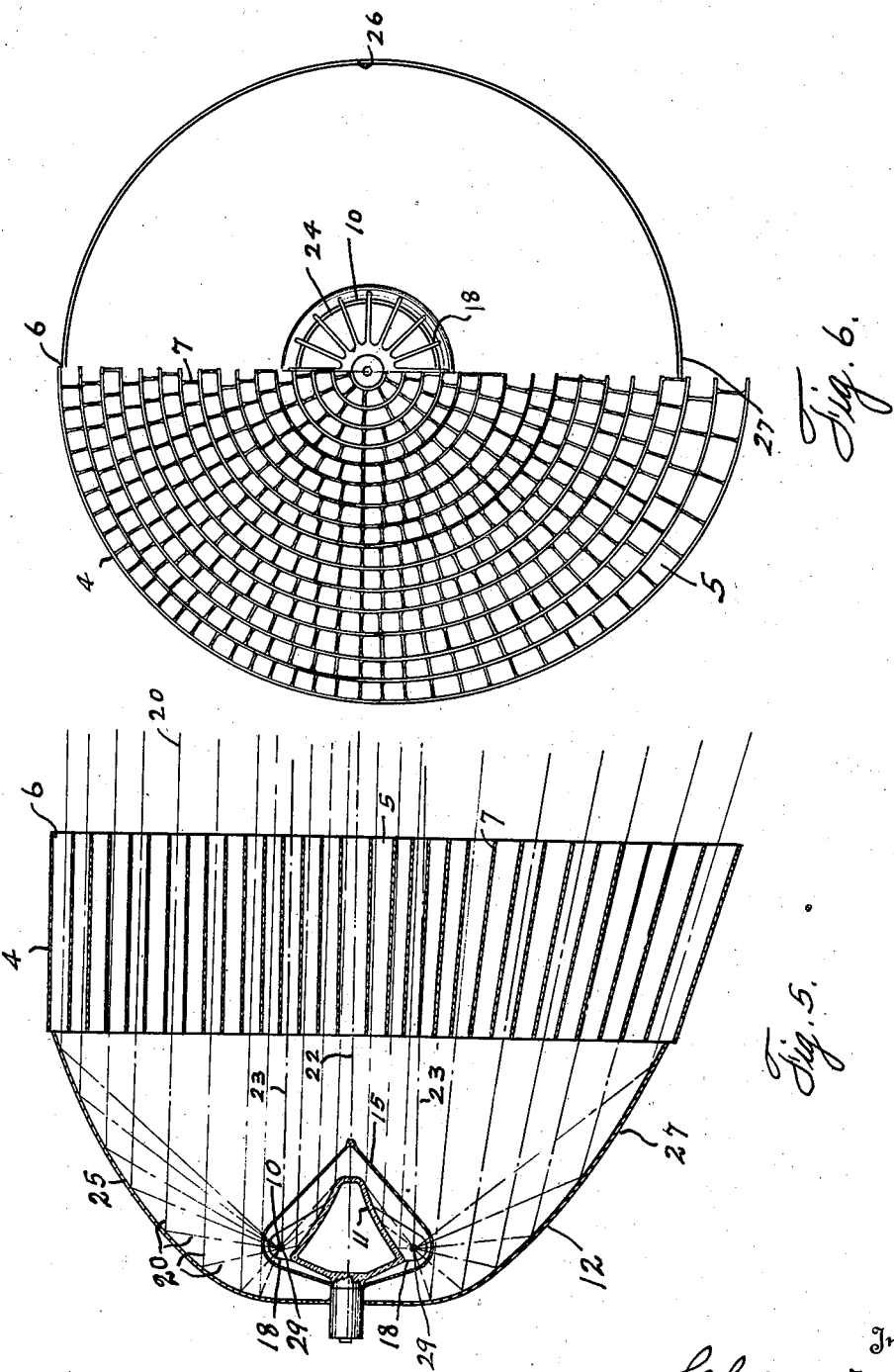

March 15, 1927.
C. N. SCOTT
1,621,224
HEADLIGHT
Filed June 8, 1925 4 Sheets-Sheet 4
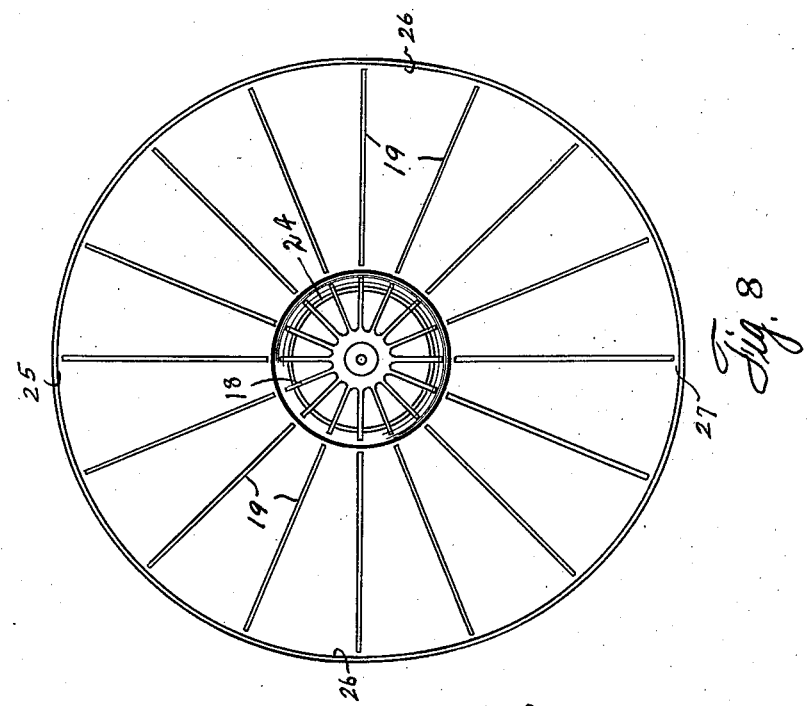
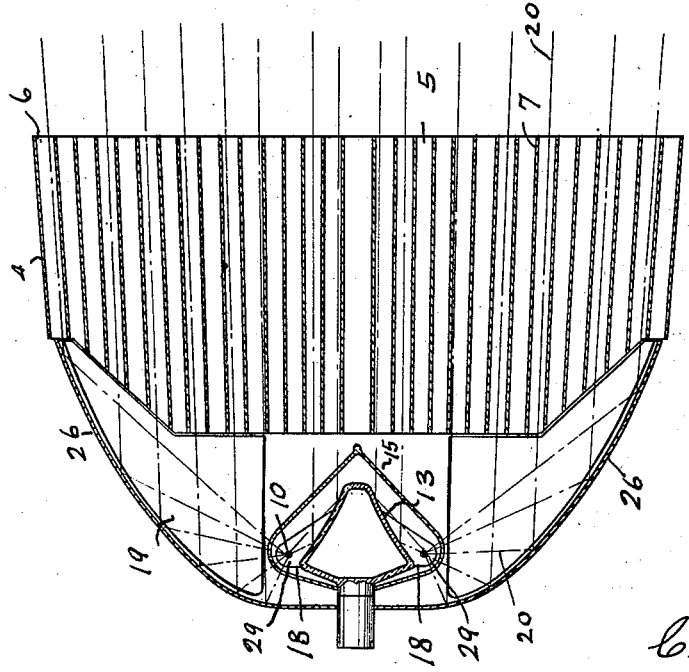
Inventor
Clarence N. Scott
By Hardway & Cathey
Attorneys

Patented Mar. 15, 1927.

1,621,224

UNITED STATES PATENT OFFICE.

CLARENCE N. SCOTT, OF HOUSTON, TEXAS.

HEADLIGHT.

Application filed June 8, 1925. Serial No. 35,515.

This invention relates to new and useful improvements in headlights of the type particularly adapted for use on motor vehicles.

One object of the invention is to provide an improved headlight which will effectively light the roadway, and objects ahead of the vehicle, on which the light is used, without blinding glare in the eyes of those in front of and approaching, or looking toward, said vehicle.

A feature of the invention, designed to accomplish said object, resides in the provision of a headlight in which the preponderance of the rays of light emitted from the source, generally a filament, will be sharply and definitely reflected and distributed from one, or more, reflectors in the directions, and for the distances, and throughout the cross road area required, with a minimum of random reflected rays, and the resulting refraction and diffusion of light, the so called blinding glare within the reflector bowl and immediately in front of the vehicle.

Another feature, designed to accomplish said object, resides in the provision of a headlight so designed that the said random rays and the accompanying refraction, diffusion and glare which cannot be entirely eliminated will be materially shaded or obstructed, from the eyes of those looking towards the vehicle, from a point substantially out of alignment with the axis of the reflector, this result being accomplished without materially interfering with the projection of the, preponderating rays of light sharply and definitely reflected and distributed from the reflector, or reflectors in the directions and for the distances and throughout the cross road area required. The invention also embodies a construction whereby a more intense incandescence of the filament, or greater intensity of light, may be utilized, resulting in a more effective lighting of the roadway without the blinding effect, above adverted to.

With the above and other objects in view this invention has particular relation to certain novel features of construction, arrangement of parts, and use, an example of which is given in this specification and illustrated in the accompanying drawings, wherein:—

Figure 1 is a longitudinal vertical sectional view showing one form of the headlight, showing the filament concentrated as far as practical on the axis of the reflector at the common focus from which all the unit longitudinal curves of the reflector are developed.

Figure 2 shows a cross sectional view, thereof, taken on the line 2—2 of Figure 1.

Figure 3 shows a longitudinal vertical sectional view, of another form of headlight, in which the source of light or filament, is disposed in the form of a relatively small circle, or ring, the path of which corresponds with the focal circle on which lie all the foci and focal axes from which all the unit longitudinal curves of the reflector are developed, only one reflector, bowl shaped in form, being employed.

Figure 4 shows a fragmentary front elevation of the headlight contemplated in Figure 3, showing one side of the cellular shade, or shield, broken away.

Figure 5 shows a longitudinal vertical sectional view of another form of headlight showing the source of light, the filament, disposed in the form of a circle, relatively larger than that shown in Figure 3, and the path of which corresponds with the focal circle on which lie all the foci and focal axes from which all the unit longitudinal curves of both the inner and outer reflectors are developed; this design contemplating the use of two reflectors, the inner or "knob" form of reflector, and the outer, or bowl shaped reflector.

Figure 6 shows a fragmentary front elevation thereof, showing the cellular shade or shield, partly broken away.

Figure 7 shows a horizontal sectional view of the headlight showing a modified form of shield employed and also showing the outer reflector equipped with non-reflecting radial shields, and Figure 8 shows a front view of this type of reflector.

In the various figures no outer casing is shown, as any conventional type of casing may be employed.

Referring now more particularly to the drawings wherein like numerals of reference designate similar parts in each of the figures the numeral 1 designates one form of outer reflector employed. In this type of headlight there is a source of light, a filament 2, concentrated as far as practical on the axis of the reflector at the common focus from which all the unit longitudinal curves of the reflector 1, are developed. This filament is housed in the usual globe 3.

There is a cellular shade or shield, designated as a whole, by the numeral 4. This shield is similar in each of the forms shown and will be suitably mounted in the headlight casings in front of the reflectors.

This shield is of cellular formation and is formed of suitable durable material, such as metal. Its cells 5 are open at both ends forming light passageways, and are confined within a suitable surrounding rim 6. A modified form of the shield is shown in Figure 7, which extends further into the outer reflector than the type shown in the other figures.

The cells 5 are separated by thin walls 7 which are so disposed that they substantially align with those rays of properly reflected light which they intercept. The inside of the rim 6 is so circumscribed and flared as to substantially encompass and parallel the outer rays of light definitely reflected from the outer edges of the outer reflector. The surfaces of the walls or partitions 7, between the cells, and the inside surface of the outer rim 6, are non-reflecting except that such of the surfaces as would reflect light downward and generally not be visible to an observer ahead, should be reflecting surfaces to aid in the illumination of the surface of the road and roadside ahead. The cross sectional dimensions of the cells are of such proportion to the lengths of the cells, or light passageways, as to obstruct, shield, or shade, by angular obstruction, the major portion of the reflector surfaces and the cubical interior of the reflector bowl from the view of the observer located in front and out of alignment with the axis of the reflector.

In Figure 3 the source of light is illustrated as a filament 8, disposed in a relatively small circle or ring, the path of which corresponds with the focal circle on which lie all the foci and focal axes from which all of the unit longitudinal curves of the reflector 9, of this form, are developed. In this form of headlight only one, the outer, reflector is employed. In the form shown in Figure 5 the source of light, the filament, 10 is disposed in a relatively larger circle, or ring, than that shown in Figure 3, and its path corresponds with the focal circle on which lie all the foci and focal axes, from which all the unit longitudinal curves of both, the inner reflector and the outer reflector 12 are developed. The inner reflector 11 is located within the filament 10 and has its outer or reflecting surfaces formed of longitudinal curves, also of parabolic and near parabolic form with all their foci lying on the same focal circle to the end that the rays of light emitted from the inside circumferential surface of the common filament ring 10 will be sharply and definitely reflected ahead and bordering the rays reflected from the outer reflector 12, and will thus substantially fill in the central void lying within the innermost rays reflected from said outer reflector. The filaments 8 and 10 are housed in the respective globes 14 and 15.

It will be seen that the source of light, or filament, is disposed substantially in the form of a circle, or ring, disposed crosswise of and having its common center on the common axis of the reflector, and the path of the filament forms a focal circle on which lie all the foci and focal axes from which all the longitudinal curves of the reflector or reflectors are developed to the end that each and every unit of length of the incandescent filament will be in substantial focus with its corresponding longitudinal curve, or unit of the reflector, or reflectors, which lie on the same radial line drawn from the common axis of the reflector, or reflectors, the center of the filament circle, and to the further end that there will be no portion of the incandescent filament out of correct focus with the reflector, or reflectors.

It will further be seen that the invention comprehends the use of reflectors whose longitudinal curves comprise a combination of parabolic and near parabolic curves with the focus of each and every curve lying on the focal circle, above referred to, the same being the path of the circular filament, the curves being so disposed that they merge from substantially parabolic on the top center to near parabolic on each side center and to near parabolic on the bottom center, the slight divergence from parabolism on the side centers being that necessary to spread and distribute the rays of light laterally through the required lateral angle but substantially horizontal, and the greater divergence from parabolism on bottom center being that necessary to distribute the rays of light throughout the vertical angle formed by and between the horizontal common axis of the reflector and those rays reflected from the lowest point of the reflector bowl which contact with the road surface a few feet ahead of the vehicle. In developing the longitudinal curves merging between the parabolic top center curves and the near parabolic side center curves it is desirable that they be so disposed that all the rays reflected by them will be substantially horizontal; and in developing the longitudinal curves merging between the near parabolic side center curves and near parabolic bottom center curve it is desirable that they be so disposed that a majority of the rays reflected by them be distributed on the surface of the road and roadside ahead. A cross section through any part of any reflector will be a circular curve.

In the form shown in Figure 3 there is disposed around the filament support 16 and within the filament 8, a nonreflecting band 17 forming a shield, provided for the purpose of absorbing the rays of light from the inside surface of said filament, and thus preventing said rays from being reflected at random on the diametrically opposed surface of the single reflector 9, employed in this form of headlight.

In the form of headlight employing a circular, or ring, shaped filament, a series of nonreflecting radial shields 18, are employed, each so disposed across the path of the filament as to obstruct or shield from reflection, or refraction, a large percentage of those rays of light emitted from the filament in a tangential direction. If desired these shields 18, may be, in effect extended across the outer reflector by providing aligned inside radial nonreflecting shields 19 within the outer reflector, for the same purpose as that specified for the shields 18.

The numeral 20 designates, on the illustrations, the path of the rays of light emitted from the filament, and reflected by the reflectors. As hereinbefore referred to the axis of the reflector is designated by the numeral 21 and the common axis of the reflectors is designated by the numeral 22; the numeral 23 designates the focal axis of its corresponding longitudinal curve of the reflector or reflectors; the numeral 24 designates the focal circle on which all the foci and focal axes of the unit longitudinal curves of the reflector, or reflectors lie; the numeral 25 designates the top center parabolic unit longitudinal curve of the outer reflector; the numeral 26 designates the side center near parabolic unit longitudinal curves of the outer reflector; the numeral 27 designates the bottom center near parabolic unit longitudinal curve of the outer reflector; the numeral 28 designates the focus of the reflector; the numeral 29 designates one of the foci lying on the focal circle and is the focus of its corresponding longitudinal curve of the reflector or reflectors.

What I claim is:—

A headlight including a reflector, a filament of substantially circular form, disposed cross wise with respect to the axis of the reflector and having its center on said axis, a series of non-reflecting radial shields disposed across the path of the filament so as to obstruct the rays of light emitted from said filament in a tangential direction, a non-reflecting shield arranged within the circle of the filament and a cellular shield having light passageways arranged in front of the reflector.

In testimony whereof I have signed my name to this specification.

CLARENCE N. SCOTT.